United States Patent [19]

Kotch et al.

[11] Patent Number: 5,363,738
[45] Date of Patent: Nov. 15, 1994

[54] PORTABLE ELECTROHYDRAULIC TRAINER

[75] Inventors: Richard J. Kotch, Macomb; John A. O'Brien, Waterford; George A. McConnell, Beverly Hills, all of Mich.

[73] Assignee: Vickers, Incorporated, Maumee, Ohio

[21] Appl. No.: 100,389

[22] Filed: Aug. 2, 1993

[51] Int. Cl.⁵ .................. F01B 25/26; F15B 13/044
[52] U.S. Cl. .......................................... 91/1; 91/459; 91/DIG. 4
[58] Field of Search ............... 91/1, 459, DIG. 4, 361; 92/5 R; 60/484

[56] References Cited

U.S. PATENT DOCUMENTS

| | | |
|---|---|---|
| 2,882,618 | 4/1959 | Thompson . |
| 3,047,964 | 8/1962 | Fried . |
| 3,156,255 | 11/1964 | Gasquet et al. . |
| 3,703,931 | 11/1972 | Page et al. . |
| 3,842,517 | 10/1974 | LaChance . |
| 3,910,177 | 11/1978 | Roess et al. ............ 91/361 |
| 4,201,051 | 5/1980 | Hall . |
| 4,475,442 | 10/1984 | Breeden . |
| 4,481,451 | 11/1984 | Kautz et al. ............ 91/361 X |
| 4,553,734 | 11/1985 | Oka et al. . |
| 4,650,425 | 3/1987 | McGarry . |
| 4,687,179 | 8/1987 | Smith ............ 91/361 X |
| 4,745,744 | 5/1988 | Cherry et al. . |
| 4,757,747 | 7/1988 | Blatter et al. . |
| 4,813,335 | 2/1989 | Wakiya et al. . |
| 4,896,553 | 1/1990 | Sato et al. ............ 91/361 X |
| 5,009,067 | 4/1991 | Bonnell . |

FOREIGN PATENT DOCUMENTS

| | | | |
|---|---|---|---|
| 2021695 | 12/1979 | United Kingdom . | |
| 2254909 | 10/1992 | United Kingdom ............ 91/459 |

OTHER PUBLICATIONS

EEC, The Training Company, Jan. 1977, "Aviation Week and Space Technology" Vickers, Portable Hydraulic Trainer, Bulletin C-2100 (1967).
Vickers catalog entitled "Hydraulics Plus Electronics Systems and Components" (1985).
Vickers catalog U.S.-465-5.0-0.4-1 (Apr. 1989) "EHT1 Portable Electrohydraulic Trainer".
Vickers Catalog 400A "Hydraulics & Electronics Systems and Components", pp. K25-K28, I6, K59-K61, R3-R6 Dec. 1989.

*Primary Examiner*—Edward K. Look
*Assistant Examiner*—Hoang Nguyen
*Attorney, Agent, or Firm*—Barnes, Kisselle, Raisch, Choate, Whittemore & Hulbert

[57] ABSTRACT

Apparatus for training an operator in use of electrohydraulics that includes an electric-motor/hydraulic-pump with an integrated fluid sump mounted on a portable support. An electrohydraulic valve on the support is preconnected to the pump, and has at least one solenoid valve responsive to valve control signals for controlling the valve to supply fluid from the pump. A hydraulic cylinder is carried on the support and preconnected to the valve for generating mechanical motion as a function of fluid supplied by the valve from the pump. An electronic controller is mounted on the support. A plurality of electrical connectors are mounted on an operator panel on the support and individually preconnected behind the operator panel to the valve controller, to the solenoid of the electrohydraulic valve and to a mechanism on the panel for generating an operator command signal. The electrical connectors are selectively interconnectable by the operator using suitable removable cables for configuring the controller, command generator and valve in a desired electronic control configuration.

5 Claims, 2 Drawing Sheets

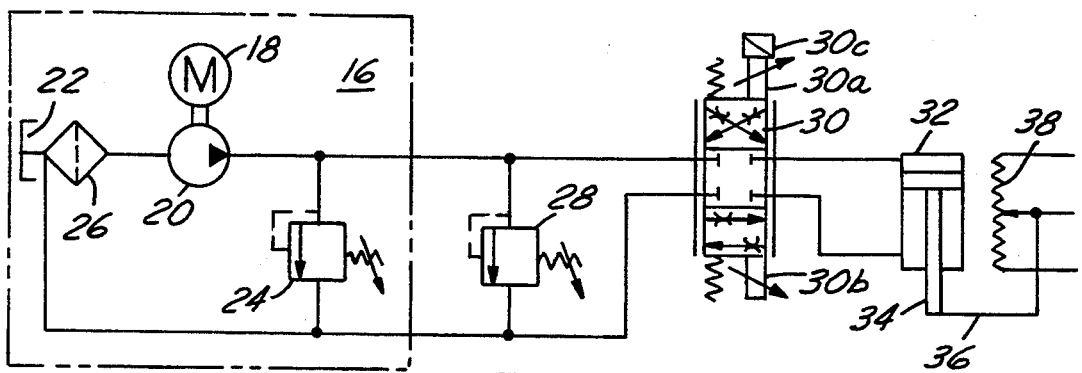
FIG.3
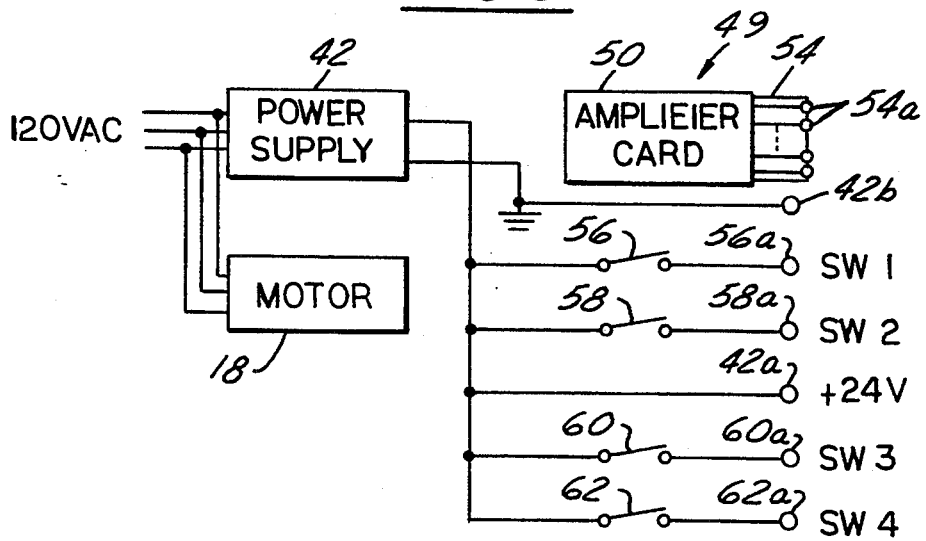
FIG.4
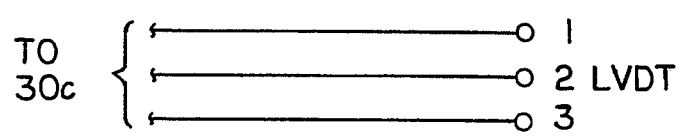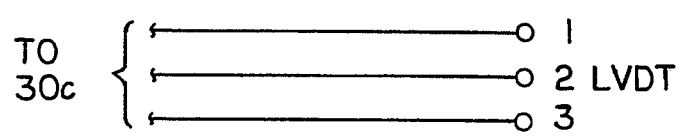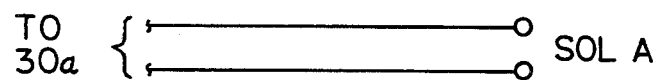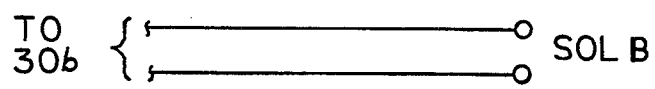

PORTABLE ELECTROHYDRAULIC TRAINER

The present invention is directed to electrohydraulic control systems, and more particularly to an apparatus for training an operator in theory and practice of electrohydraulic equipment and associated control electronics.

BACKGROUND AND OBJECTS OF THE INVENTION

Apparatus has heretofore been marketed by applicant's assignee for use as a training aid in theory and practice of hydromechanical fluid power systems. In such apparatus, a plurality of hydromechanical devices, such as fluid-powered hydraulic motors, valves and cylinders, are mounted on a vertical panel carried by a wheeled frame. A hydraulic pump is carried by the frame, and is selectively connectable by quick-disconnect hoses to one or more of the hydromechanical devices. All components are standard industrial devices with which the laboratory or classroom trainee thus becomes familiar through a series of exercises or problems set by an instructor or instruction manual. For training in electrohydraulics, which represents the current trend in the fluid power industry, an electrohydraulic servo trainer module has been provided as a separate unit or as an accessory to the standard hydromechanical trainer.

U.S. Pat. No. 5,009,067 assigned to the assignee hereof discloses apparatus for training an operator in theory and practice of electrohydraulic control systems. The apparatus includes a plurality of electrohydraulic devices for performing hydraulic operations as differing functions of associated electronic control signals. A plurality of differing electronic controllers are adapted to generate electronic control signals to operate the electrohydraulic devices. The electronic controllers bear graphic indicia identifying the controller and associating each controller with corresponding electrohydraulic devices on the training unit. Each controller has a plurality of available input, output and control connections, which may be selectively interconnected with each other and with the electrohydraulic devices by suitable cables for configuring the controller and associated devices with a multiplicity of differing operating modes. The electrohydraulic devices are connectable by quick-disconnect hoses to a fluid power source carried by the trainer, and are associated with indicia for generating a visually observable indication of operation of the devices, so that an operator can observe effects of differing electronic control configurations on the devices.

Although the apparatus described above and discussed in the noted patent have met with substantial acceptance and success in both the academic and industrial training environments, further improvements remain desirable. In particular, both of such apparatus are fairly large, embodying a multiplicity of hydraulic and/or electronic apparatus. What is needed, and what the present invention seeks to provide, is a small training unit that may be lifted manually and transported in the trunk of a car, for example, so as to be readily transportable to training sites and/or a student's home for practice. Another object of the present invention is to provide a small and readily portable electrohydraulic trainer of the described character that emphasizes training in the electronic control aspects of electrohydraulics, as distinguished from the hydromechanical aspects of electrohydraulic systems. Yet another object of the present invention is to provide a trainer of the described character that is economical to manufacture, and yet is versatile in terms of capability for training a student or technician in a variety of electronic control situations, and that realistically simulates situations that the trainee may encounter in the field while at the same time providing a user-friendly mechanism for enhanced trainee understanding of electronic control theory and practice.

SUMMARY OF THE INVENTION

Apparatus for training an operator in use of electrohydraulics in accordance with a presently preferred embodiment of the invention includes an electric-motor/hydraulic-pump unit with an integrated fluid sump mounted on a portable support. An electrohydraulic valve on the support is preconnected to the pump and has at least one solenoid valve responsive to valve control signals for controlling the valve to supply fluid from the pump. A hydraulic load device is carried on the support and preconnected to the valve for generating mechanical motion as a function of fluid supplied by the valve from the pump. An electronic controller is replaceably mounted on the support. A plurality of electrical connectors are mounted on an operator panel on the support and individually preconnected behind the operator panel to the valve controller for providing input, output and control connections to the controller, to the solenoid of the electrohydraulic valve for providing valve control segments to the solenoid, and to a mechanism on the panel for generating an operator command signal. The electrical connectors are selectively interconnectable by the operator using suitable removable cables for configuring the controller, command generator and valve in a desired electronic control configuration —e.g., open loop, closed loop, etc.

At least one and preferably both of the electrohydraulic valve and load devices include facility for generating an electrical feedback signal as a function of operation of the valve or load device. The electronic controller generates the valve control signal as a combined function of the operator command signal and the feedback signal(s), and the plurality of connectors on the operator panel include connectors individually preconnected to the valve/load feedback means. The portable support in the preferred embodiment of the invention takes the form of a rectangular enclosure, with the operator panel comprising one wall of the enclosure, and the control means and all electrical preconnections being disposed within the enclosure. The electric-motor/hydraulic-pump unit with integrated fluid sump is mounted with the valve on the enclosure behind a protective panel adjacent to the operator panel, and the hydraulic load device comprises a cylinder with position feedback sensor mounted on the front side of the protective panel for operator visual observation of mechanical action at the load cylinder.

BRIEF DESCRIPTION OF THE DRAWINGS

The invention, together with additional objects, features and advantages thereof, will be best understood from the following description, the appended claims and the accompanying drawings in which:

FIG. 3 is a schematic diagram of the trainer hydraulics; and

FIG. 4 is a schematic diagram of the trainer electronics.

DETAILED DESCRIPTION OF THE PREFERRED EMBODIMENT

Figure 1:
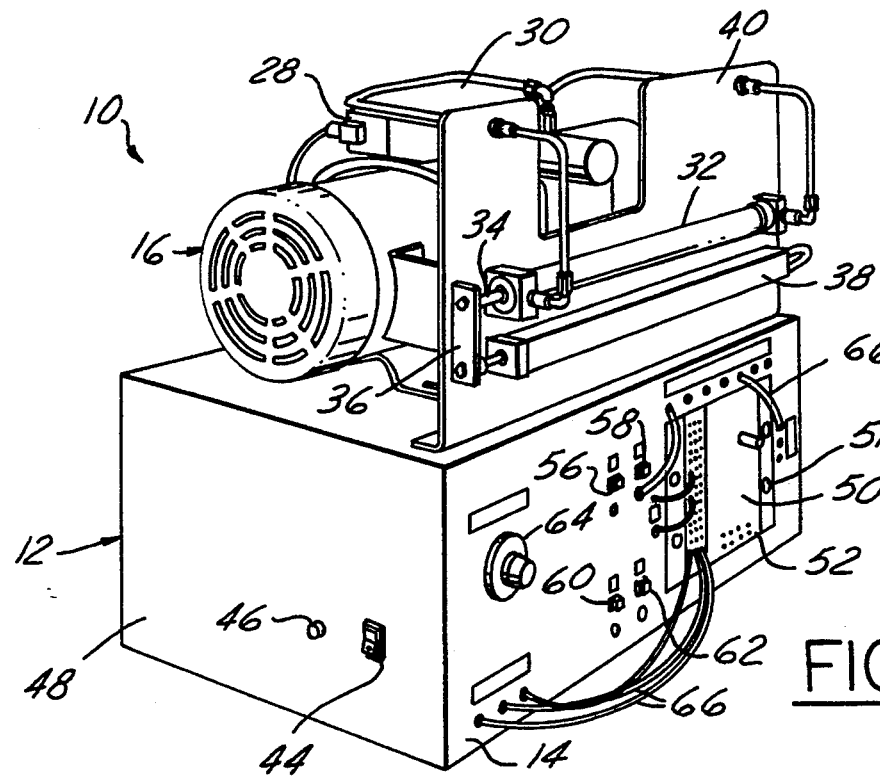
FIG. 1 is a perspective view of a portable electrohydraulic trainer in accordance with a presently preferred embodiment of the invention.

FIGS. 1–4 illustrate a portable electrohydraulic trainer 10 in accordance with a presently preferred embodiment of the invention as comprising a rectangular enclosure 12 having an operator panel 14 as one sidewall thereof. An electric-motor/hydraulic-pump unit 16 includes a motor 18 and a pump 20 (FIG. 3) integrated within a unitary housing along with an internal fluid sump 22, a pressure regulator 24 and a filter 26. A second pressure regulator 28 is mounted on the motor/pump, together with a proportional valve 30 for providing fluid under pressure from the pump as a function of control signals to the solenoids 30a, 30b of valve 30. The fluid ports of valve 30 are connected to a cylinder 32 that has a shaft or rod 34 connected by a bracket 36 to a potentiometer-type position sensor 38. Integrated motor/pump unit 16, pressure regulator 28 and valve 30 are mounted behind a protective panel 40 that is fastened to enclosure 12 adjacent and parallel to operator panel 14. Cylinder 32 and position sensor 38 are mounted on the front of panel 40 for visual observation by the operator. All of the hydraulic connections between motor/pump 16, pressure regulator 28, valve 30 and cylinder 32 are permanent preconnections, which do not require adjustment or intervention by the operator.

Within enclosure 12, a power supply 42 (FIG. 4) receives electrical utility power by means of a power switch 44 (FIG. 1) and a power cord (not shown). A fuse 46 adjacent to switch 44 on a sidewall 48 of enclosure 12 protects the power supply, and pump motor 18 connected in parallel with power supply 42. An amplifier card assembly 49 is removably fastened to operator panel 14 within an aperture 52 by a plurality of screws 51. Assembly 49 comprises a conventional amplifier card 50 from the product line of applicants' assignee secured to an extender assembly 54 that brings the card electrical connections to panel 14 in the form of a plurality of final connector terminals 54a. That is, amplifier card 50 is of conventional type, having an electrical connector at one edge. Such connector is electrically connected to extender 54 that is disposed on operator panel 14 adjacent to card 50. The multiplicity of female connection terminals 54a are connected to the connector of amplifier card 50 and disposed in an array on the face of panel 14 in a configuration that corresponds to the disposition within the amplifier card connector. Four single pole switches 56–62, labeled "SW1" through "SW4" on the face of panel 14, are connected on one side to power supply 42, and on the opposing side to associated female connector terminals 56a–62a adjacent to the respective corresponding switches. Power supply 42 also is connected to a female connector terminal 42a labeled "+24V," and to a return or ground connector terminal 42b.

Figure 2:
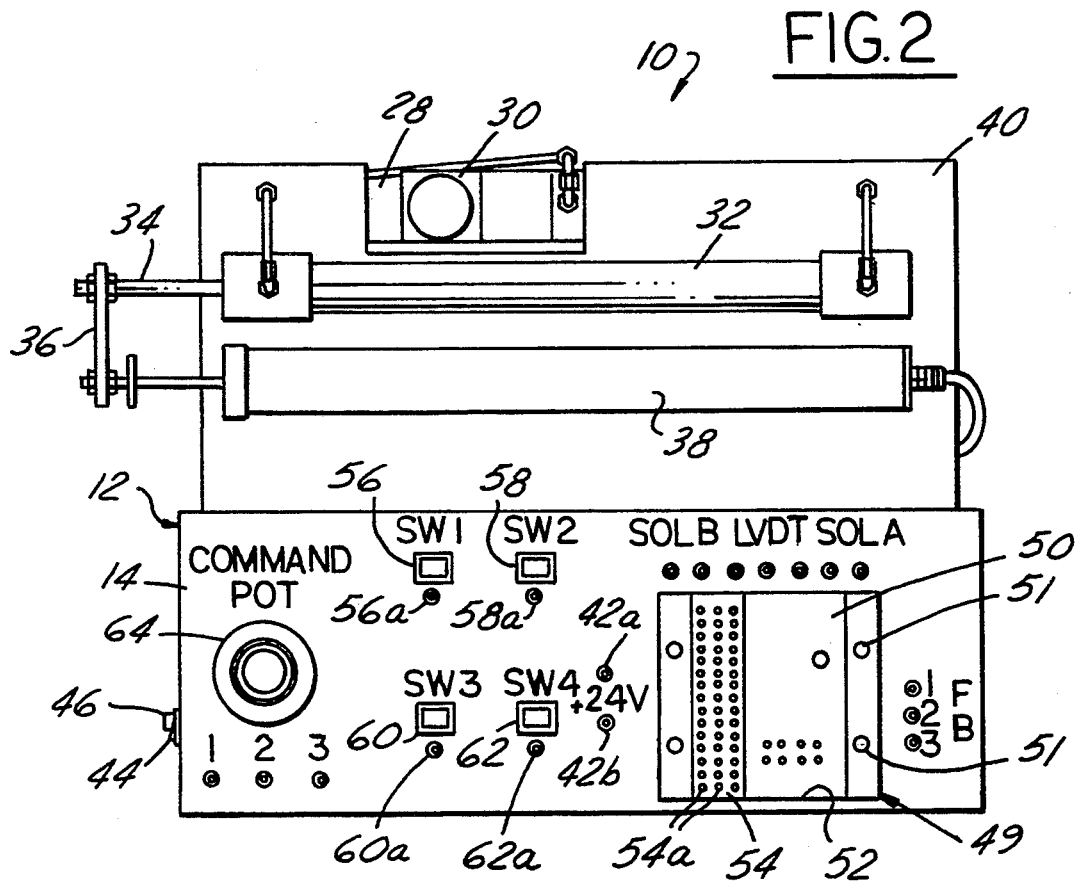
FIG. 2 is a front elevational view of the trainer illustrated in FIG. 1.

A variable position rotary command potentiometer 64, labeled "COMMAND POT", is connected to associated terminals 64-1, 64-2 and 64-3 positioned beneath potentiometer 64 on panel 14. Solenoids 30a and 30b of valve 30 are connected to associated female connection terminals labeled "SOL A" and "SOL B" on panel 14, as are the three lines from feedback potentiometer 38 connected to terminals labeled "FB-1," "FB-2" and "FB-3." An LVDT 30c (FIG. 3) is mounted on valve 30 and operatively coupled to the valve element for providing feedback signals to female connector terminals on panel 14 respectively labeled "LVDT-1," "LVDT-2" and LVDT-3." All of the electrical connections illustrated in FIG. 4 are preconnected within enclosure 12, with the various female connector terminals being positioned on operator panel 14 as illustrated in FIGS. 1 and 2. Trainer 10 is also provided with a multiplicity of electrical cables 66 with suitable male connectors on each end for selectively interconnecting the various female connector terminals positioned on the operator panel.

In use, the electrical control connections among the switches, amplifier card and other elements may be made by the operator as appropriate for a training exercise. For example, connector terminals 54a, 42b may be connected to the power input and ground terminals of card 50 to provide switched electrical power thereto. The main command input to the amplifier card may be connected to command pot 64, and the feedback input terminals of card 50, available at extender 54, may be connected to LVDT 30c and/or feedback potentiometer 38, and the output terminals of card 50 may be connected to solenoids 30a, 30b. Switches 58–62 may also be used to generate command signals.

There is thus provided a small portable hydraulic trainer that satisfies all of the objects and aims previously set forth. All of the hydraulic components are preconnected to form a closed hydraulic fluid system and fluid supply. In the same way, all of the various electrical components are preconnected to connector terminals disposed on an operator panel, for selective interconnection by an operator or trainee using the cables 66 in accordance with lessons or guidance from a teacher or training manual. Amplifier card 50 may be selectively replaced in the trainer so as to make available to a trainee a multiplicity of otherwise conventional control cards and schemes. In a presently preferred embodiment of the invention, valve 30 comprises a KFDG4V32 valve, relief valve 28 comprises a DGMC3PT valve, cylinder 32 comprises a TB01AABA1A cylinder, and amplifier card 50 may comprise either an EEAPAM533D30 closed-loop control card or an EEAPAM533A30 open-loop control card, all conventional devices within the electrohydraulic product line of applicants' assignee. Other devices may, of course, be employed.

The invention claimed is:

1. Apparatus for training an operator in use of electrohydraulics comprising:

a portable support including a rectangular enclosure having an operator panel on one wall of said enclosure, an electric-motor/hydraulic-pump integrated within a unitary housing along with an internal fluid sump, said unitary housing being mounted on a second wall of said enclosure contiguous with said one wall, an electrohydraulic valve on said support preconnected to said pump with at least one solenoid responsive to electronic valve control signals for controlling said valve to supply fluid from said pump, a hydraulic load on said support preconnected to said valve for mechanical motion as a function of fluid supplied by said valve, electronic control means on said support within said enclosure and responsive to command signals for generating said valve control signals, command means on said panel responsive to an operator for generating said command signals, a plurality of electrical connectors on said operator panel individually preconnected behind said panel within said enclosure to said command means, said control means and said at least one solenoid, means for selectively interconnecting said connectors externally of the enclosure, and a second panel on said enclosure adjacent to, parallel to and extending from said operator panel, said electric-motor/hydraulic-pump housing and said valve being disposed behind said second panel and preconnected to each other by means inaccessible at said operator panel and said second panel, said load comprising a hydraulic cylinder mounted in front of said second panel above said operator panel.

2. The apparatus set forth in claim 1 wherein at least one of said electrohydraulic valve and load includes means for generating an electrical feedback signal as a function of operation of said valve and load, wherein said electrical control means includes means for generating said valve control signal as a combined function of said command signal and said feedback signal, and wherein said plurality of connectors on said panel include connectors individually preconnected to said feedback means.

3. The apparatus set forth in claim 1 wherein said command means comprises a rotary potentiometer.

4. The apparatus set forth in claim 1 wherein said command means comprises at least one electric switch.

5. The apparatus set forth in claim 1 wherein said electrohydraulic valve comprises a proportional valve having opposed solenoids, and wherein said plurality of connectors include connectors individually preconnected to both of said solenoids by conductors inaccessible at said operator panel and said second panel.

* * * * *